Dec. 22, 1959  M. DI GIOVANNI  2,918,641
ELECTRICAL STRAIN WIRE TRANSDUCERS
Filed Nov. 26, 1957  3 Sheets-Sheet 1

INVENTOR.
MARIO DIGIOVANNI
BY Philip Subkow
Max Geldin
ATTORNEYS

Dec. 22, 1959  M. DI GIOVANNI  2,918,641
ELECTRICAL STRAIN WIRE TRANSDUCERS
Filed Nov. 26, 1957  3 Sheets-Sheet 2

INVENTOR.
MARIO DIGIOVANNI
BY
ATTORNEYS

Dec. 22, 1959   M. DI GIOVANNI   2,918,641
ELECTRICAL STRAIN WIRE TRANSDUCERS
Filed Nov. 26, 1957   3 Sheets-Sheet 3
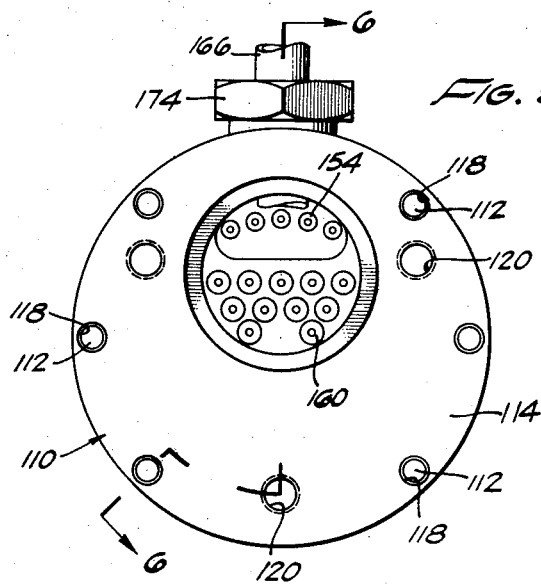
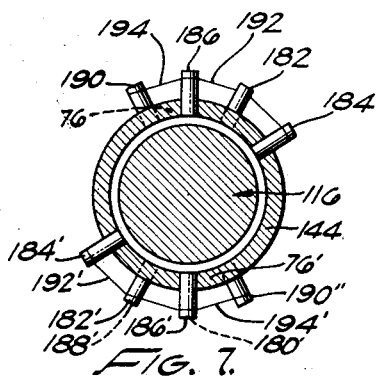
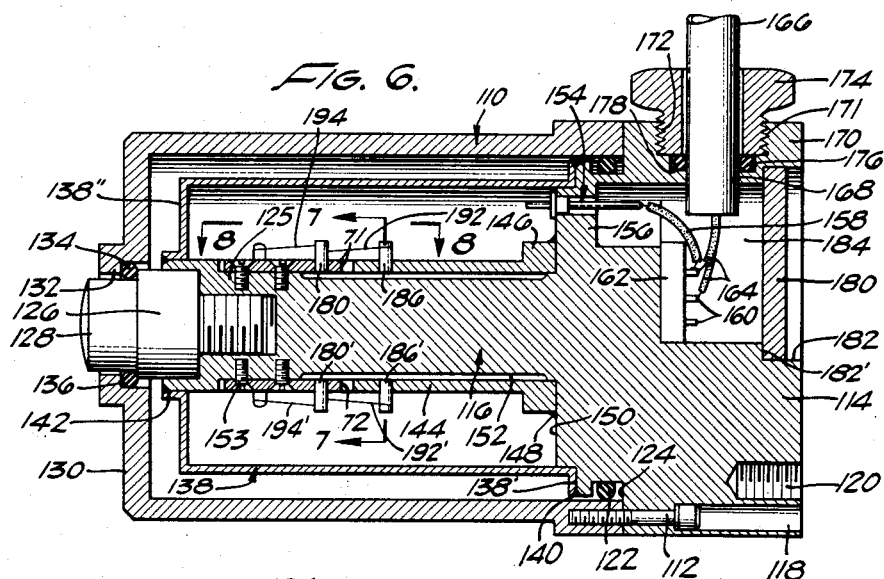
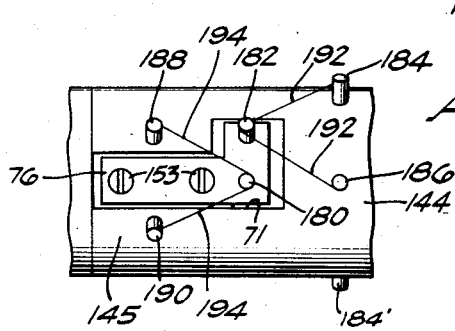
INVENTOR.
MARIO DI GIOVANNI
BY
ATTORNEYS

United States Patent Office 2,918,641
Patented Dec. 22, 1959

2,918,641

ELECTRICAL STRAIN WIRE TRANSDUCERS

Mario Di Giovanni, Pacific Palisades, Calif., assignor to Statham Instruments, Inc., Los Angeles, Calif., a corporation of California Application November 26, 1957, Serial No. 698,942

20 Claims. (Cl. 338—4)

This invention relates to a transducer capable of measuring force such as pressure or acceleration, or displacement, and is particularly concerned with a transducer or load cell for measuring pressures or forces of large magnitude.

An object of this invention is the provision of a novel transducer or load cell employing a wire whose resistance changes when it is subjected to tension, and particularly to the unbonded type of such electrical resistance wire strain gage transducer or load cell.

Another object is to provide a transducer or load cell having a novel combination of structural features permitting efficient measurement of forces or displacement.

A still further object is to provide an instrument of the aforementioned type having low hysteresis, and further wherein the change in strain of the strain wire may be different from the change in strain of an elongated member to which the strain wire is connected.

Another object is to provide a transducer or load cell having the above characteristics and wherein the strain wire is protected against atmospheric elements such as humidity.

A particular object is to afford a novel device of the foregoing characteristics in the form of a load cell or a pressure transducer capable of measuring high loads or pressure, yet which has high sensitivity and accuracy.

The above objects are accomplished according to the invention by providing an elongated member which may be tubular or solid and which is anchored at one end to a substantially rigid member, in the form of a block, a force summing member connected to said elongated member and adapted to apply a force axially of said member to cause it to be tensioned or stretched axially away from the rigid member, an armature connected adjacent one end of said elongated member, and an unbonded electrical strain wire connected to said armature and to a substantially fixed member. Said fixed member can be connected to said rigid block member or to some other portion of the frame. Also, preferably, the distance between the wire connections on said armature and the wire connections on said fixed member is less than the length of the elongated member.

When a force or pressure is applied to the elongated member to cause it to be stretched or elongated, the armature carried by said elongated member is also displaced, together with one end of the strain wire carried by said armature. However, the rigid block connected at one end of said elongated member has a substantially larger cross section than said elongated member, and remains substantially fixed relative to the axial displacement of the elongated member, and said fixed member which is preferably attached to said block, and to which fixed member the other end of the strain wire is connected, remains relatively stationary. Hence, the strain wire is tensioned between its movable and stationary connections, producing an output from a bridge circuit proportional to said force or displacement of the elongated member.

Where a relatively stiff elongated member is employed for measurement of large forces or pressures, a relatively small displacement of said member will produce a relatively substantial change in strain of the unbonded strain wires, providing good sensitivity and accuracy of the instrument. Further, by use of an elongated member which is relatively stiff so that only a small displacement thereof is produced, undesirable hysteresis effects are eliminated.

Where the length of the elongated member is greater than the length of the strain wire between the wire connections, although both said elongated member and the strain wire have the same overall displacement, the percentage variation in the length of the strain wire will be greater than the corresponding percentage variation in length of the elongated member. As result of this difference in length variation between the strain wire and the elongated member, the strain of the wire due to stretching of the elongated member is amplified, producing a corresponding amplification of output from the bridge circuit in which the strain wire is connected.

As an added feature, a jacket can be placed around the elongated member, the armature and the strain wire, to thus seal off these members, particularly the strain wire, from ambient atmospheric conditions, especially humidity, which adversely affect operation of the instrument over a period of time.

According to one embodiment of the invention there is provided an elongated member in the form of an extensible tube closed at one end and connected at its other end to a relatively rigid block member, a force summing member, and a fluid connection between the force summing member and the closed end of the tube for displacement thereof in proportion to a force, acceleration or pressure applied to the force summing member. Where the instrument is used for measurement of pressure, the force summing member can be a diaphragm, deflection of which is transmitted by the pressure fluid connection to the closed end of the elongated tubular member. An armature of length shorter than the tube is connected to the outer end of the tube, and extends longitudinally of and parallel to the tube exteriorly thereof, and is spaced therefrom, so that the armature is free to move with the tube when it is expanded by an applied pressure. A strain wire is connected between the free end of the armature and a frame member connected to said block member.

In another embodiment the tube of the aforementioned modification is replaced by a solid member or strain column, and in place of a diaphragm, a rod is connected to one end of said column. Displacement of said rod along the axis of said column produces a displacement of the armature and a change in strain of the strain wire connected thereto, as in the aforementioned embodiment.

The invention will be more clearly understood by reference to the following description of a preferred embodiment, taken in connection with the accompanying drawings wherein:

Fig. 5 is an end view of a modification of the device of Fig. 1 with the end plate removed to show the terminals;

Fig. 6 is an irregular section taken on line 6—6 of Fig. 5;

Fig. 7 is a vertical section taken on line 7—7 of Fig. 6; and

Fig. 8 shows a detail in plan of the device of Fig. 6.

Figure 1:
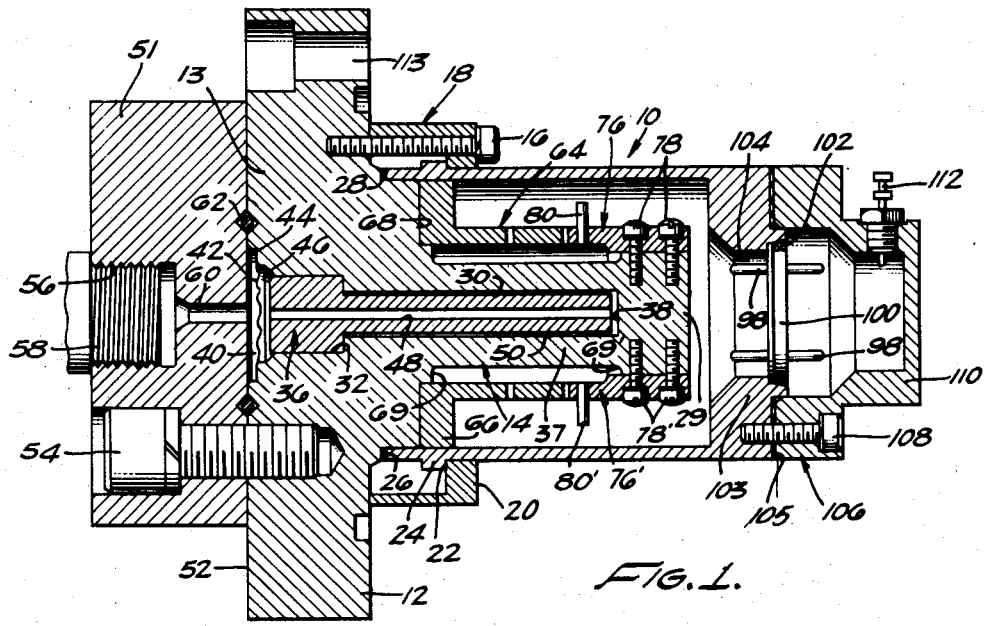
Fig. 1 is a longitudinal section through my device.
Figure 2:
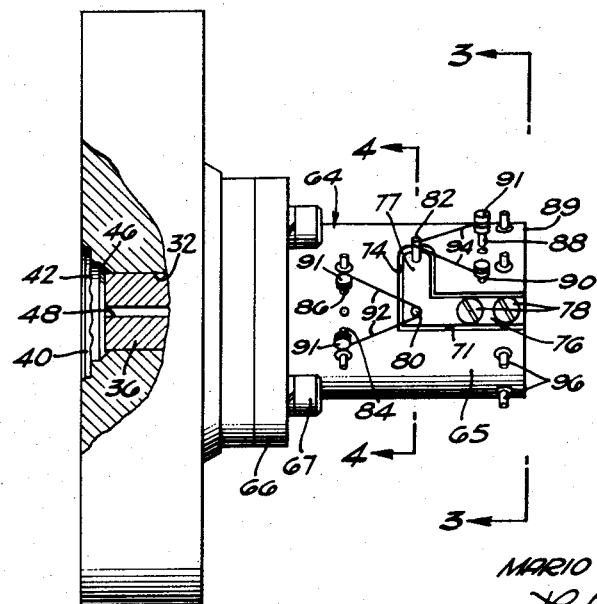
Fig. 2 is a plan view of the device of Fig. 1 with the outer case and certain other parts removed.

Referring particularly to Figs. 1 and 2, there is shown a unit comprising a case 10 which is axially connected by means of screws 16 to a rigid block 13 carrying an integral tubular member 14 extending axially from one side of said block, and a peripheral flange 12 integrally formed about said block. The screws 16 pass through a ring 18 having an outer flange 20, the inner shoulder 22 of which abuts a rib 24 on the outer periphery of the case 10. The inner end of ring 18 abuts the flange 12. The inner end of case 10 is disposed against a shoulder 26 formed on member 14 adjacent the flange 12, and a gasket 28 is positioned between said inner end of case 10 and shoulder 26. Thus, the ring 18 and screws 16 function to clamp the case 10 to the tubular member 14.

The tubular member 14 has an outwardly extending axially disposed solid end 29, and said tube portion 14 is of substantially smaller diameter than the diameter of block 13 and the inner diameter of case 10, and contains an axial bore 30 communicating at one end with the closed end 29 of member 14 and at its other end with a counterbore 32 of larger diameter formed in the block member 13. The end portion 29 is a thickened rigid member having a diameter slightly larger than tube 14. A plug 36 is disposed within the bores 30 and 32, said plug being shaped and having a diameter such as to substantially fill the counterbore 32 and such that the outer longitudinally extending portion 37 of the plug within bore 30 is spaced a short distance from the wall of bore 30 and from the outer end 38 of bore 30. At the inner end of member 13 there is provided a recess 40 of larger diameter than the counterbore 32. A diaphragm 42 is positioned across the recess and fixed to the shoulder 44 by any suitable means such as spot welding. A recess 46 is also provided between the diaphragm and the adjacent end of the plug 36 to permit freedom of movement of the diaphragm. An axial bore 48 is provided within the plug 36, said bore communicating at one end with the recess 46 adjacent the diaphragm, and at the other end with the end wall 38 of the bore 30. A pressure fluid of any suitable character, preferably a liquid having a small coefficient of compressibility, is placed in the spaces in recess 46 adjacent the diaphragm, bore 48 and the spaces between the elongated outer end 37 of plug 36 and the adjacent inner walls 50 and 38 of tubular member 14. A pressure cap 51 is mounted against the inner end 52 of the block 13, by means of screws 54. A threaded bore 56 is axially formed in cap 51 for engaging a threaded pressure connection 58. A smaller axial bore 60 is also formed in the cap 51 communicating with bore 56 therein and with the recess 40 in member 13. A gasket 62 is provided between the abutting faces of the pressure cap 51 and the block 13.

It will be seen that pressure fluid entering bore 56 and applied against the diaphragm 42 will produce displacement thereof to the right, viewing Fig. 1, and the force of such displacement will be transmitted via the liquid in the bore 48 of the plug 36 to the tube 14. This force against the walls 38 and 50 of the tube will cause the tube portion 14 to expand outwardly, that is, to the right as viewed in Fig. 1 and also, to some extent, the tube portion 14 will expand diametrically thereof. The purpose of the plug or baffle 36 is to decrease the volume of fluid required for transmission of an applied force from the diaphragm to the tube 14. Since any pressure fluid employed will have a certain amount of compressibility, by designing the instrument to employ a minimum volume of fluid, a more positive force connection is provided between the diaphragm and tube 14. When pressure is thus applied to diaphragm 42, and transmitted to the fluid in bore 48, and the resulting force applied to the end 29 of tube 14 stretches said tube, the block 13 which is integral with said tube remains substantially rigid or fixed because of its large cross section, and does not stretch outwardly with said tube 14. Also, the end portion 29 is substantially rigid, and moves with the outer end of tube 14 as the latter is displaced. Hence, the tube stretches substantially only between the shoulder 69 on block 13 and the shoulder 69' on the end member 29.

Figure 3:
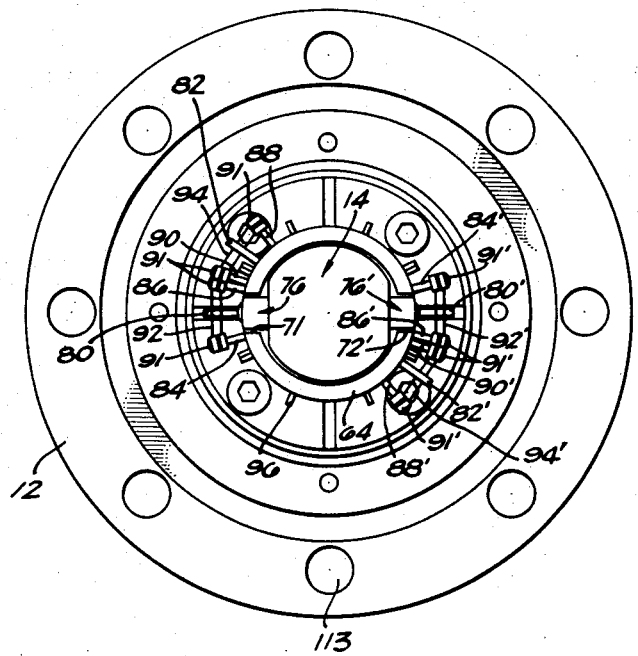
Fig. 3 is an end view taken on line 3—3 of Fig. 2.
Figure 4:
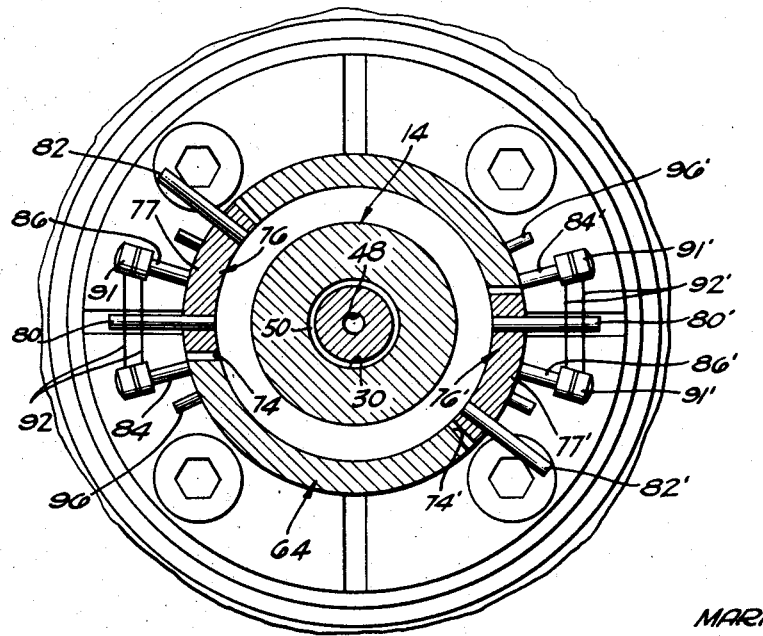
Fig. 4 is a section taken on line 4—4 of Fig. 2.

Mounted about the inner end of the tubular member 14 and spaced therefrom is a cylindrical frame 64, on the inner end of which is integrally connected a flange 66 which abuts and is connected to a shoulder 68 of the tubular member 14 by bolts 67 (see Fig. 2) the outer periphery of the flange 66 abutting the inner surface of the case 10. The outer end 65 of frame 64 is disposed around the end portion 29 of the tube 14, but there is sufficient clearance between 65 and 29 to permit movement of member 29 relative to 65. It will thus be seen in Figs. 1 and 3 that the tubular member 14 is spaced from the inner surface of the surrounding frame 64 so that said tube portion 14 can be displaced with respect to said frame 64. The frame 64 carries a pair of L-shaped slots 71 and 72, the longer axially extending portions of said slots being disposed diametrically opposite each other. The shorter base portion 74 of slot 71 extends in one direction circumferentially about the frame 64, while the base portion 74' of the L-shaped slot 72 extends in the opposite direction circumferentially about the frame 64, both of said slot portions 74 and 74' being in transverse alignment with each other, as further seen in Fig. 4.

Mounted within slots 71 and 74 is an L-shaped armature 76, the side edges of said armature being spaced from the adjacent edges of the slots 71 and 74. The L-shaped armature 76 is connected at its outer end to the end portion 29 of tubular member 14 by means of a pair of screws 78. Similarly, in slots 72 and 74' is mounted a second L-shaped armature 76' of the same shape as armature 76, the side edges of armature 76' being spaced a short distance from the side edges of the slots 72 and 74'. The outer end of armature 76' is connected to the end 29 of tubular member 14 by means of screws 78'. It is noted that on extension of tubular member 14 as result of pressure applied against diaphragm 42, the armatures 76 and 76' will be displaced longitudinally along with the end 29 of tubular member 14, the circumferential slots 74 and 74' providing sufficient clearance so that on movement of the base members 77 and 77' of the armatures, e.g., in a direction to the right as viewed in Fig. 2, such base members 77 and 77' of the armatures will not contact the edge of slots 74 and 74'.

Mounted on the base portion 77 of armature 76 are a pair of spaced insulated pins 80 and 82. A pair of insulated pins 84 and 86 are mounted in spaced circumferential relation on the frame 64 adjacent the flange 66 thereof, the pins 84 and 86 being equidistant from the pin 80. A pair of insulated pins 88 and 90 are circumferentially mounted in spaced relation about the circumference of frame 64 adjacent the outer end 89 thereof said pins being equally spaced from pin 82 and on the opposite side of frame 64 from the pins 84 and 86. Pins 84, 86, 88 and 90 carry an insulator spacer member 91. Between pins 84 and 86 and pin 80 are connected in tension a pair of spaced strain wires 92, said wires 92 being maintained in spaced parallel relation by the insulator spacers 91. Similarly, a pair of strain wires 94 are mounted in tension between pins 88 and 90 and pin 82, said wires being maintained in spaced parallel relation by the spacer insulators 91.

In like manner the base member 77' of the L-shaped armature 76' carries a pair of spaced insulator pins 80' and 82' spaced circumferentially of each other and diagonally opposite pins 80 and 82, and the frame member 64 carries a pair of insulated pins 84' and 86' diagonally opposite pins 84 and 86, and a pair of circumferentially spaced insulator pins 88' and 90' diagonally opposite pins 88 and 90. All of pins 84', 86', 88' and 90' carry a spacer insulator 91'. A pair of strain wires 92' are mounted in spaced parallel relation between the spacer insulators 91' on pins 84' and 86', and pin 80' on the armature. Also a pair of strain wires 94' are mounted in spaced parallel relation between the spacer insulators 91' on pins 88' and 90' and the pin 82' on the armature 76'.

Hence it will be seen that when a positive pressure is applied to the diaphragm to cause an outward expansion at the end 29 of tube portion 27, carrying the armatures 76 and 76' therewith in a longitudinal direction to the right, as viewed in Figs. 1 and 2, the strain wires 92 and 92' will be subjected to an increased tension while the strain wires 94 and 94' will be relaxed. By means of suitable leads (not shown) connected to the ends of the strain wires, said strain wires may be formed into a bridge circuit in a manner well understood in the art, and the changes in tension in the strain wires translated into an output from such circuit proportional to the force or pressure applied to diaphragm 42. Terminals 96 are provided on the frame 64 for connection to the leads which are attached to the ends of the strain wires, and terminals 98 (see Fig. 1) are provided for connecting the terminals 96 by means of leads (not shown) to an outside source of potential. The terminals 98 are mounted on a plate 100 positioned in a groove 102 formed in a flange 103 on the outer end of the case 10, said outer end being apertured at 104 to provide space for the terminals. A cover 106 is positioned on the outer end of the case 10 by means of screws 108, said cover carrying an outer flange 110 in which are mounted connecting terminals 112 which are connected to the terminals 98 by means of leads (not shown). A gasket 105 is positioned between members 103 and 106. Holes 113 are provided about the periphery of flange 12 to accommodate fasteners such as screws (not shown) for mounting the instrument on a base member (not shown).

Viewing particularly Figs. 1 and 2, it will be noted that the length of the tubular member 14 extending outwardly from the block 13 between shoulders 69 and 69' is substantially longer than the distance between pins 84 and 86, and 80, or the distance between pins 88 and 90, and pin 82, these latter distances being the same as the distance between pins 84' and 86' and pin 80, and between pins 88' and 90', and pin 82. Thus, when the tubular portion 14 is extended to the right by an applied positive pressure to diaphragm 42, the armatures 76 and 76' will be carried the same distance to the right, at the same time carrying therewith the pins 80, 82 and 80', 82', while the pins 84, 86 and 84' and 86' remain stationary, since these pins are connected to frame member 64 which is fixed to the substantially rigid block 13. Since the distance between the pins 84 and 86, and 80, and the distance between the pins 84' and 86', and 80' in each case is smaller than the length of the tube 14, the percentage change in strain wires 92 and 92' as result of outward extension of tube 14 will be greater than the resulting strain in said tube 14 in inverse proportion to these distances. This means that the elongation of tube portion 14 will produce a magnified strain in the strain wires 92 and 92'. Thus, where a relatively stiff tube 14 is employed say for measuring high pressures, e.g., of the order of 10,000 to 100,000 lbs. per square inch, the relatively small displacement of the tube due to the applied pressure will be magnified in the resulting strain of the strain wires 92 and 92' due to the mechanical advantage afforded, producing an instrument which can measure or sense high pressures of the order of those noted above with improved sensitivity and accuracy.

Also, it will be noted that by the connection of the tube 14 at one end to the substantially rigid end member 29 so that said end member does not stretch, but only the tube between the shoulders 69 and 69' is displaced, said tube is subjected to a greater percentage elongation for a given force than if said end portion 29 were also distended along with said tube. This structure also provides for increased sensitivity and accuracy of the instrument.

In Figs. 5 to 8 is shown another modification of the invention transducer or load cell, corresponding part numbers in such modification referring to the same parts described and shown in the embodiment of Figs. 1 to 4. The instrument comprises a case 110 which is connected by means of screws 112 to a block 114 carrying an integral axially disposed strain column 116, screws 112 being disposed in bores 118 about the periphery of the block 14. The outer end of the block 114 also contains threaded bores 120 for attachment of the instrument to a base member (not shown). A ring seal 122 is disposed in a recess 124 about an inner portion of block 114, and contacts the adjacent inner periphery of case 110.

The strain column 116 is of substantially smaller diameter than case 110 and carries at its outer enlarged end 125 a threadably engaged capped screw 126 to which is integrally attached a rod 128 which extends exteriorly of the end 130 of case 110, through an aperture 132 of said end 130, said aperture providing sufficient clearance between the rod and the end of the case to permit freedom of movement of said rod with respect to said case. A ring seal 134 is provided between the inner end of rod 128, and an inner shoulder 136 at the end of the case, said ring seal abutting the end of the screw 126. An inner jacket 138 with flanged ends 138' and 138'' has its flanged end 138' connected as by welding at 140 to a shoulder on the inner periphery of block 114, the other flanged end 138'' being connected as by welding at 142 to the outer end of strain column 116.

Mounted about the inner end of column 116 is a frame member 144 having a flange 146 at its inner end, said flange being connected as by welding at 148 to the inner shoulder 150 of block 114. The outer end 145 of frame member 144 is disposed about the enlarged outer end 125 of column 116 but there is sufficient clearance between members 125 and 145 to permit relative displacement between these members. There is also a space 152 provided between the major portion of column 116 and said frame member 144 so that said column can be displaced with respect to said frame member 144. The outer end of frame member 144 has a pair of L-shaped slots 71 and 72 as described above and shown in Fig. 2.

Mounted within slots 71 and 72 of the device of Figs. 5 to 8 are the L-shaped armatures 76 and 76' which are connected to the outer end 125 of column 116 by screws 153. Armatures 76 and 76' carry the pins 180, 182 and 180', 182', to which are connected the strain wires 192, 192', and 194, 194', the ends of said wires being connected respectively to pins 184, 186, pins 184', 186', pins 188, 190, and pins 188', 190', all mounted on frame member 144.

It will accordingly be seen that when rod 128 is pulled to the left as seen in Fig. 6, this will produce a stretching or elongation of the strain column 116 to which the rod 128 is attached, the block 114 and frame 144 remaining substantially stationary, and the stiff outer end 125 of column 116 being displaced with column 116, but not itself elongated. The stretching of column 116 as above described will produce a displacement of the L-shaped armatures 76 and 76' which are connected to the outer end of said column, thus producing a tensioning in strain wires 192 and 192' and a relaxation of the strain wires 194 and 194'. Suitable leads (not shown) are connected to the ends of the strain wires of the device of Figs. 5 to 8, connecting said strain wires in a bridge circuit in the conventional manner, so that the changes in strain in the strain wires as result of stretching or elongation of the strain column 116, produces an output from the bridge circuit proportional to the force applied to the rod 128 and creating the stretching in strain column 116.

The terminals 154 are mounted adjacent the inner peripheral portion 156 of the block 114, the leads (not shown) which are connected to the ends of the strain wires being connected to said terminals. Terminals 154 are in turn connected via leads 158 to another set of terminals 160 mounted on a rear shoulder 162 of block 114, said terminals in turn being connected through leads 164 to an external source of potential. Leads 164 pass through a cable 166 which is mounted in an aperture 168 in an outer peripheral portion 170 of block 114. Peripheral portion 170 is counterbored at 172 for threaded engagement with a nut 174 which when turned down in tightened position as shown in Fig. 6 abuts a seal 176 disposed in a recess 178 of peripheral portion 170, between aperture 168 and the counterbore 172. A cover 180 is adapted for mounting in a recess 182 provided in the outer end of block 114, cover 180 abutting an inner shoulder 182' on block 114. There is thus provided within block 114 and cover 180 an enclosed space 184 which contains the leads 158, 164 and the terminals 160.

The provision of the inner jacket 138 encloses and seals the strain wires and the associated structure including the armatures 76 and 76', frame member 144 and the strain column 116 from ambient atmospheric conditions such as moisture present in the air externally of the jacket 138. This particularly prevents deterioration of the strain wires due to moisture ordinarily present in the air.

Viewing particularly Figs. 6 and 8, it will be seen that the length of the strain column 116 is substantially greater than the distance between the pins on which the respective strain wires 192, 192' and 194, 194' are mounted. Thus when the strain column 116 is stretched or elongated as above described by an outward force applied to the rod 128, the percentage variation in length of the strain wires 192 and 192' subjected to tension is substantially greater than the percentage variation in length of the strain column 116. Hence the elongation of the strain column 116 will produce an amplified or magnified strain in the strain wires 192 and 192', such amplification of the strain in the strain wires being related to the strain produced in the strain column in inverse proportion to their respective lengths. This means that a substantial load can be applied to the rod 128, which load, even though it produces only a minor variation in elongation of the column 116, affects a magnified strain in the strain wires, resulting in improved sensitivity and accuracy of the instrument.

It will be understood that instead of employing the instrument of Figs. 1 to 4 for measuring pressures, I can replace the diaphragm 42 by a force summing member such as a rod and piston for measuring forces applied to the rod axially of the instrument. Further, instead of such diaphragm and rod, or in place of rod 128 of Fig. 6, I can employ a weighted member or a mass for measuring linear acceleration along the axis of the instrument.

Although I have shown armatures 76 and 76' as being L-shaped, said armatures may have any other desired shape so as to enable each of said armatures to carry a pair of spaced pins such as 80 and 82 adjacent the free end thereof. Thus, for example, if desired, these armatures can be of simple rectangular shape instead of L-shaped. Also, instead of employing a cylindrical member such as 64 or 144, with slots therein to accommodate the armatures 76 and 76', I can omit such frame member, and attach the fixed pins, e.g., pins 84 and 86, to any fixed portion of the instrument such as to block 13 or 144. Further, I can employ more than two armatures, if I so desire.

While I have described particular embodiments of my invention for the purpose of illustration, it should be understood that various modifications and adaptations thereof may be made within the spirit of the invention as set forth in the appended claims.

I claim:
1. An instrument which comprises an elongated member, a substantially rigid member connected to an end of said elongated member, a force summing member, means connecting said force summing member to a portion of said elongated member spaced from said rigid member, said elongated member being mounted to elongate away from said rigid member in response to a force transmitted to said elongated member by said connecting means, an armature connected adjacent one end of said elongated member and extending longitudinally thereof, the opposite end of said armature being free, said armature moving longitudinally of said elongated member in response to elongation thereof, a first wire connection mounted on said armature adjacent the free end thereof, a second fixed wire connection, and an electrical resistance strain wire connected to said wire connections.

2. A transducer which comprises a tube, a substantially rigid block member connected to one end of said tube, a substantially rigid end member connected to the other end of the tube and closing said end, a force summing member, a fluid connection between said force summing member and said tube, said tube being mounted to elongate away from said block member in response to a force transmitted to said tube by said fluid, an armature connected adjacent one end of said tube and extending longitudinally thereof, the opposite end of said armature being free, said armature moving longitudinally of said tube in response to elongation thereof, a fixed frame member, a first wire connection on said armature adjacent the free end thereof, a second wire connection on said frame member, and an electrical resistance strain wire connected to said wire connections.

3. A transducer which comprises an elongated member, a substantially rigid member connected to an end of said elongated member, a diaphragm, a fluid connection between said diaphragm and said elongated member, said last named member being mounted to elongate away from said rigid member in response to a force transmitted to said elongated member by said fluid, an armature connected adjacent one end of said elongated member and extending longitudinally thereof, the opposite end of said armature being free, said armature moving longitudinally of said elongated member in response to elongation thereof, a fixed frame member, a first wire connection on said armature adjacent the free end thereof, a second wire connection on said frame member, the distance between said connections being less than the length of said elongated member, and an electrical resistance strain wire connected to said wire connections.

4. A pressure transducer which comprises an elongated tube, a substantially rigid block member connected to one end of said tube, a substantially rigid end member connected to the other end of the tube and closing said end, a diaphragm, a pressure fluid connection between said diaphragm and said tube, an armature fixed at one end thereof to an end of said tube, the opposite end of said armature being free, said armature extending longitudinally of and parallel to said tube exteriorly thereof, a frame member adjacent said tube, a first wire connection on said armature adjacent said free end thereof, a second wire connection on said frame member, the distance between said wire connections being substantially less than the length of said tube, and an electrical resistance strain wire stretched in tension between said wire connections.

5. A pressure transducer which comprises a case, an elongated extensible tube in said case, a substantially rigid block member connected to one end of said tube, a substantially rigid end member connected to the other end of the tube and closing said end, a diaphragm, means for maintaining a pressure fluid between said diaphragm and the closed end of said tube, a pressure fluid in said means, an armature fixed at one end thereof to said one end of said tube, the opposite end of said armature being free, said armature extending longitudinally of and parallel to said tube exteriorly thereof, a frame member adjacent said tube and connected to said block member, a first wire connection on said armature adjacent said free end thereof, a second wire connection on same frame member, and an electrical resistance strain wire stretched in tension between said wire connections.

6. A pressure transducer which comprises a frame, an extensible tube mounted axially within said frame and spaced from the inner surface of said frame, a substantially rigid block member connected to one end of said tube, a substantially rigid end member connected to the other end of the tube and closing said end, a diaphragm mounted adjacent said one end of said tube and closing the same, a pressure transmitting liquid in said tube, longitudinally extending slots in said frame, an armature in each of said slots, each armature connected at its outer end to the outer end of said tube, the opposite ends of said armatures being free, a first wire connection mounted on each of said armatures at the free end thereof, a second wire connection mounted on said frame adjacent each of said first wire connections, and strain wires connected in tension between the respective first and second wire connections.

7. A pressure transducer which comprises a case, a frame mounted in said case, an extensible tube mounted axially in said case within said frame and spaced from the inner surface of said frame, a substantially rigid block member connected to one end of said tube, said tube having a closure at its other end, a diaphragm mounted adjacent said one end of said tube and closing the same, a pressure transmitting liquid in said tube, longitudinally extending slots in said frame, said slots being disposed substantially diametrically opposite each other along said tube, an armature in each of said slots, each armature connected at its outer end to the outer end of said tube, the opposite ends of said armatures being free, first pins mounted on said armatures at the free ends thereof, second pins mounted on said frame adjacent said first pins, and strain wires connected in tension between the respective first and second pins.

8. A pressure transducer which comprises a frame, an extensible tube mounted axially within said frame and spaced from the inner surface of said frame, a substantially rigid block member connected to one end of said tube, a substantially rigid end member connected to the other end of the tube and closing said end, a plug disposed in said tube and extending axially therein, a diaphragm mounted in said case at one end of said plug and closing said one end of said tube, a bore in said plug communicating with said diaphragm and with the rigid end member of said tube, a pressure transmitting liquid in said bore, longitudinally extending slots in said frame, said slots being disposed diametrically opposite each other along said tube, a pair of armatures, each connected at its outer end to the outer end of said tube, the opposite ends of said armatures being free, said armatures each being disposed in one of said slots, a first wire connection mounted on each of said armatures at the free end thereof, a second wire connection mounted on said frame, the distance between said first and second connections being substantially less than the length of said tube, and strain wires connected in tension between the respective first and second connections.

9. A pressure transducer which comprises a case, a frame mounted in said case, an extensible tube mounted axially in said case within said frame and spaced from the inner surface of said frame, a substantially rigid block member connected to one end of said tube, a substantially rigid end member connected to the other end of the tube and closing said end, a plug disposed in said tube and extending axially therein, a diaphragm mounted in said case at one end of said plug and closing said one end of said tube, a bore in said plug communicating with said diaphragm and with the other end of said tube, a pressure transmitting liquid in said bore, longitudinally extending slots in said frame, said slots being disposed diametrically opposite each other along said tube, a pair of armatures, each connected at its outer end to the outer end of said tube, the opposite ends of said armatures being free, said armatures each being disposed in one of said slots, first pins mounted on said armatures at the free ends thereof, second pins mounted on said frame adjacent said first pins, and strain wires connected in tension between the respective first and said second pins.

10. A pressure transducer which comprises a case, a frame mounted in said case, an extensible tube mounted axially in said case within said frame and spaced from the inner surface of said frame, a substantially rigid block member connected to one end of said tube, a substantially rigid end member connected to the other end of the tube and closing said end, a plug disposed in said tube and extending axially therein, a diaphragm mounted in said case at one end of said plug and closing said one end of said tube, a bore in said plug communicating with said diaphragm and with the other end of said tube, a pressure transmitting liquid in said bore, longitudinally extending slots in said frame, said slots being disposed diametrically opposite each other along said tube, a pair of armatures, each connected at its outer end to the outer end of said tube, the opposite ends of said armatures being free, said armatures each being disposed in one of said slots, a pair of first pins mounted on each of said armatures at the free end thereof, second pins mounted on said frame adjacent each of said first pins, the distance between adjacent first and second pins being substantially less than the length of said tube, and strain wires connected in tension between the respective first and said second pins.

11. A pressure transducer as defined in claim 10, wherein each of said armatures is L-shaped, the free ends of said armatures being the base portion of said L.

12. An instrument which comprises a substantially rigid block member, an elongated member integrally connected to and extending axially from said block member, a force summing member, a connection between said force summing member and said elongated member, said last named member being adapted to elongate away from said block member in response to a force transmitted to said elongated member by said connection, an armature connected adjacent one end of said elongated member and extending longitudinally thereof, the opposite end of said armature being free, said armature moving longitudinally of said elongated member in response to elongation thereof, a fixed frame member, a first wire connection on said armature adjacent the free end thereof, a second wire connection on said frame member, and an electrical resistance strain wire connected to said wire connections.

13. A load cell which comprises a substantially rigid block member, a strain column integrally connected to said block member and extending axially from said block member, a rod connected to said column, said column being adapted to elongate in response to a force transmitted thereto by said rod, an armature connected adjacent one end of said column and extending longitudinally thereof, the opposite end of said armature being free, said armature moving longitudinally of said column in response to elongation thereof, a fixed frame member connected to said block member, a first wire connection on said armature adjacent the free end thereof, a second wire connection on said frame member, and an electrical resistance strain wire connected to said wire connections.

14. A load cell which comprises a substantially rigid block member, a frame, a strain column mounted axially on said block member and within said frame and spaced from the inner surface of said frame, a rod axially connected to an end of said strain column, longitudinally extending slots in said frame, an armature in each of said slots, each armature connected at one end thereof to said column, the opposite ends of said armatures being free, a first wire connection mounted on each of said armatures at the free end thereof, a second wire connection mounted on said frame adjacent each of said first wire connections, the distance between said first and second wire connections being substantially less than the length of said strain column, and strain wires connected in tension between the respective first and second wire connections.

15. A device as defined in claim 13, including a jacket mounted about and spaced from said strain wire and enclosing and sealing said strain wire from ambient atmospheric conditions, and a case about said instrument and said jacket.

16. A load cell which comprises a case, a frame mounted in said case, a substantially rigid block member, a strain column mounted axially in said case within said frame integral with one end of said block member and spaced from the inner surface of said frame, a rod connected axially to an end of said strain column, longitudinally extending slots in said frame, said slots being disposed diametrically opposite each other along said column, a pair of armatures, each connected at its outer end to an end of said column, the opposite ends of said armatures being free, said armatures each being disposed in one of said slots, first pins mounted on each of said armatures at the free ends thereof, second pins mounted on said frame adjacent said first pins, the distance between adjacent first and second pins being substantially less than the length of said column, and strain wires connected in tension between the respective first and said second pins.

17. A load cell as defined in claim 16, including a jacket mounted in said case and surrounding and enclosing said strain wires, said jacket sealing said strain wires from ambient atmospheric conditions both inside and outside said case.

18. An instrument which comprises a substantially rigid block member, an elongated member integrally connected to and extending axially from said block member, a force summing member, a connection between said force summing member and said elongated member, said last named member being adapted to be displaced with respect to said block member in response to a force transmitted to said elongated member by said connection, an armature connected adjacent one end of said elongated member and extending longitudinally thereof, the opposite end of said armature being free, said armature moving longitudinally of said elongated member in response to displacement thereof, a fixed member, a first wire connection on said armature adjacent the free end thereof, a second wire connection on said member, and an electrical resistance strain wire connected to said wire connections.

19. A transducer which comprises an elongated tube, a substantially rigid block member connected to one end of said tube, said tube having a closure at its other end, a force summing member, a pressure fluid connection between said force summing member and said tube, an armature fixed at one end thereof to an end of said tube, the opposite end of said armature being free, said armature extending longitudinally of and parallel to said tube exteriorly thereof, a fixed member, a first wire connection on said armature adjacent said free end thereof, a second connection on said fixed member, and an electrical resistance strain wire stretched in tension between said wire connections.

20. A load cell which comprises a substantially rigid block member, a strain column integrally connected to said block member and extending axially from said block member, a rod connected to said column, said column being adapted to be displaced in response to a force transmitted thereto by said rod, an armature connected adjacent one end of said column and extending longitudinally thereof, the opposite end of said armature being free, said armature moving longitudinally of said column in response to displacement thereof, a fixed member, a first wire connection on said armature adjacent the free end thereof, a second wire connection on said member, and an electrical resistance strain wire connected to said wire connections.

References Cited in the file of this patent
UNITED STATES PATENTS

| | | |
|---|---|---|
| 2,751,476 | Statham | June 19, 1956 |
| 2,760,037 | Statham | Aug. 21, 1956 |